(12) United States Patent
Hu

(10) Patent No.: US 7,806,101 B2
(45) Date of Patent: Oct. 5, 2010

(54) TWO-STAGE-COORDINATION TYPE EIGHT-STROKE ENGINE

(76) Inventor: Lung-tan Hu, 25755 48th Avenue, Aldergrove, British Columbia (CA) V4W 1J6

( * ) Notice: Subject to any disclaimer, the term of this patent is extended or adjusted under 35 U.S.C. 154(b) by 0 days.

(21) Appl. No.: 12/586,635

(22) Filed: Sep. 25, 2009

(65) Prior Publication Data

US 2010/0018480 A1 Jan. 28, 2010

Related U.S. Application Data

(63) Continuation-in-part of application No. 10/619,147, filed on Jul. 15, 2003, now Pat. No. 6,918,358.

(51) Int. Cl.
*F02B 75/02* (2006.01)
(52) U.S. Cl. .................................. 123/316; 123/59.6
(58) Field of Classification Search ............... 123/52.4, 123/58.1, 59.6, 64, 311, 316
See application file for complete search history.

(56) References Cited

U.S. PATENT DOCUMENTS 6,698,405 B2 * 3/2004 Bigi ........................... 123/560

* cited by examiner

*Primary Examiner*—Noah Kamen

(57) ABSTRACT

The present invention provides a two-stage-coordination type eight-stroke engine for controlling the air-flows of the eight-stroke-operation and preventing the backfiring in the coordinate-port during the injection-process, so the coordinate-valve and the coordinate-port can be kept within the operational temperature in the heavy load operation; the two-stage-coordination system will open the coordinate-valve twice during each round of the eight-stroke-operation, so the hot-combustion-medium of the master cylinder will be mixing with the flow of the high-density-air in a conceal environment after the coordinate-valve is shut with the pressure difference, thereby reducing the heat loss and preventing the irreparable damage due to the backfiring effect.

In addition, the two-stage-coordination type eight-stroke engine also improves the response time of the coordinate-valve to the engine load changes and the engine rpm changes, while sustaining a fuel efficiency over 35% for gasoline type eight-stroke engine and 45% for the diesel type eight-stroke engine.

20 Claims, 14 Drawing Sheets

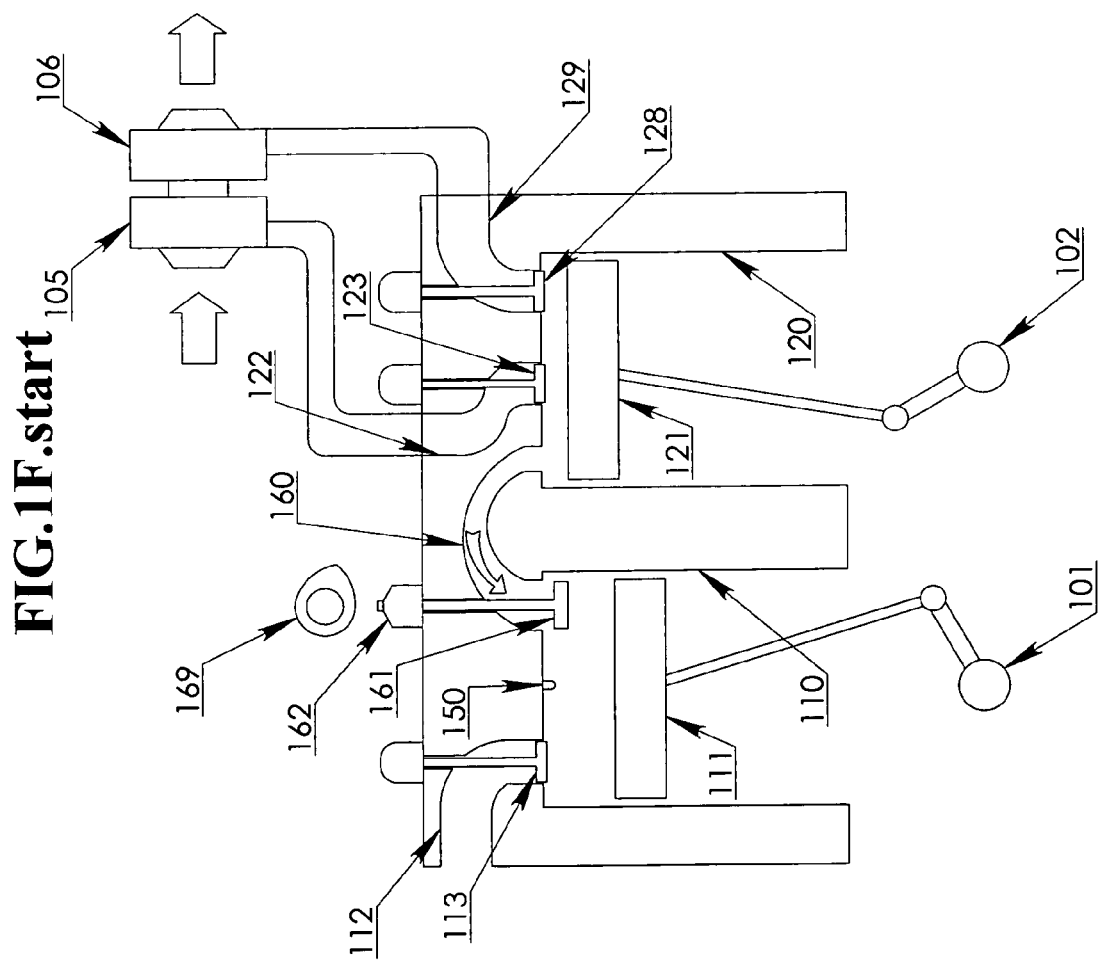

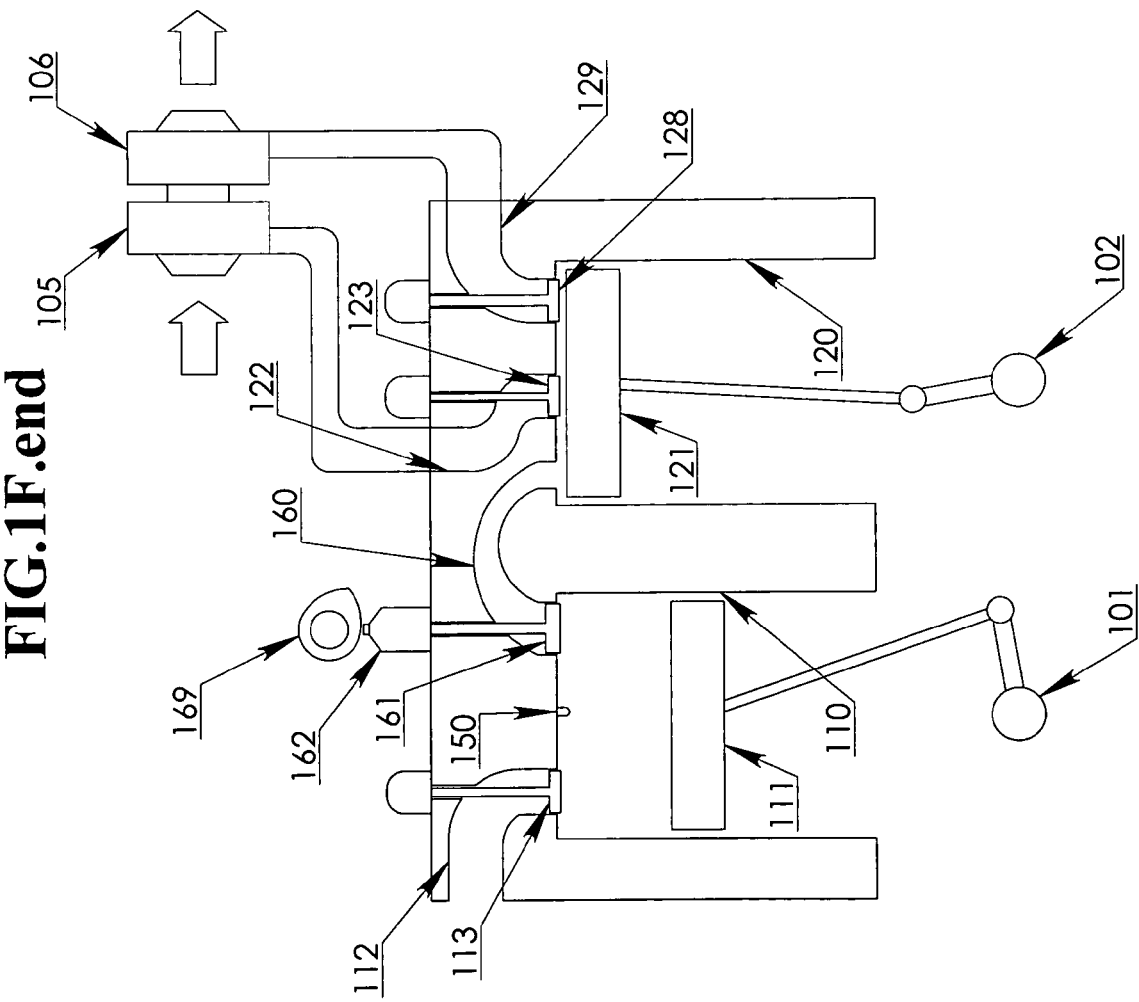

Coordinate-valve with air-guiding-grooves

Flat-type eight-stroke engine

FIG.4 A-type eight-stroke engine

TWO-STAGE-COORDINATION TYPE EIGHT-STROKE ENGINE

RELATED APPLICATION

This patent application is a continuation-in-part application of and claims priority from U.S. application Ser. No. 10/619,147, filed Jul. 15, 2003 now U.S. PAT 6,918,358.

FIELD OF THE INVENTION

The present invention relates to an advanced engine configuration of the eight-stroke internal combustion engine; and more particularly to the improvements on the coordination system of the eight-stroke engine.

The present invention is a continuing application of the eight-stroke internal combustion engine (filed on Jul. 15, 2003 with application Ser. No. 10/619,147).

The present invention can be used in the field of transportation vehicle, power generation.

BACKGROUND OF THE INVENTION

The present invention is a continuing application of the eight-stroke internal combustion engine, which was filed as U.S. Pat. No. 6,918,358 (application Ser. No. 10/619,147), and the engine of this type can also be abbreviated as the eight-stroke engine.

The original design of the eight-stroke engine suffers from low fuel efficiency in heavy load due to the backfiring effect in the coordinate-port before the slave piston has moved to the TDC of the slave-compression-stroke, this causes extremely high heat loss through the coordinate-port and may damage valve body; as this backfiring effect is undesired, several attempts with current variable valve timing mechanisms has been experimented but the actuation-timing of the coordinate valve requires a complex computation of the comparison between the master cylinder combustion pressure and the slave cylinder compression pressure and other environment factors during operation, and the open-time is too short for the mechanically controlled variable-valve-timing to perform correctly in the high speed application, therefore a new solution is required.

According to the concept of the eight-stroke-operation, after the high-density-air (which is also referred as the compressed air from the slave cylinder) of the coordinate-port is injected into the master cylinder, the combustion medium of the master cylinder will come into contact with more oxygen, thereby speeding up the combustion reaction of the carbon monoxide into the carbon dioxide, which will increase the overall pressure in the master cylinder (this process is referred to as the second combustion in the previous eight-stroke engine patent application); if the air flows between the master cylinder and the slave cylinder are correctly regulated as in the theory of the eight-stroke-operation, the fuel efficiency can be over 35% for gasoline type eight-stroke engine and 45% for the diesel type eight-stroke engine (small vehicle applications).

To conclude with the experiment data of the eight-stroke engine prototype, it is found that the valve timing of coordinate-port is extremely difficult to control in high rpm operation with a load change (sudden load increase or load decrease); thus this is the main objective to overcome the above-mentioned technical difficulty.

SUMMARY OF THE INVENTION

It is the main objective of the present invention to provide a two-stage-coordination type eight-stroke engine that can manage the air flows between the master cylinder and the slave cylinder in any operational rpm and load condition, thereby preventing the backfiring effect in the coordinate-port and reducing the heat loss.

It is the second objective of the present invention to provide a two-stage-coordination type eight-stroke engine that can sustain long-term heavy load operation with better durability.

It is the third objective of the present invention to provide a two-stage-coordination type eight-stroke engine that can maintain a fuel efficiency over 35% in both the light load and heave load conditions.

BRIEF DESCRIPTION OF THE DRAWINGS

FIG. 1A to FIG. 1H are the illustrative view of the two-stage-coordination type eight-stroke engine configured with 90 degree phase difference in different processes of the eight-stroke-operation.

FIG. 1A is the illustrative view of the two-stage-coordination type eight-stroke engine in the master-intake-process at about 30 degree of crankshaft reference angle, wherein the master-intake-valve is opened to admit air into the master cylinder.

FIG. 1B is the illustrative view of the two-stage-coordination type eight-stroke engine in the slave-intake-process at about 120 degree of crankshaft reference angle, wherein the slave-intake-valve is opened to admit air into the slave cylinder.

FIG. 1C is the illustrative view of the two-stage-coordination type eight-stroke engine in the master-compression-process at about 220 degree of crankshaft reference angle, wherein the master piston is compressing the air in the master cylinder.

FIG. 1D is the illustrative view of the two-stage-coordination type eight-stroke engine in the slave-intake-process at about 290 degree of crankshaft reference angle, wherein the slave piston is compressing the air into the coordinate-port as a high-density-air.

FIG. 1E is the illustrative view of the two-stage-coordination type eight-stroke engine in the hot-combustion-process at about 365 degree of crankshaft reference angle, wherein an air-fuel mixture is combusting in the master cylinder as a hot-combustion-medium, and the air-pressure of the coordinate-port is still increasing.

FIG. 1F.*start* is the illustrative view of the two-stage-coordination type eight-stroke engine at the initiation point of the injection-process at about 420 degree of crankshaft reference angle, the air-pressure of coordinate-port is increased to over the combined force of the hot-combustion-medium and the spring tension on the coordinate-valve, a flow of high-density-air is injected into the master cylinder from the coordinate-port during this process; the coordinate-valve is opened by the pressure difference between the coordinate-port and the master cylinder during the injection-process.

FIG. 1F.*end* is the illustrative view of the two-stage-coordination type eight-stroke engine at the end point of the injection-process at about 440 degree of crankshaft reference angle, the air-pressure in the coordinate-port has dropped to about equal to the pressure of the master cylinder, therefore, the spring tension on the coordinate-valve pulls the coordinate-valve back to the shut position, a cold-expansion-medium is formed in the master cylinder by the end of the injection-process.

FIG. 1G is the illustrative view of the two-stage-coordination type eight-stroke engine in the cold-expansion-process at about 500 degree of crankshaft reference angle, wherein the cold-expansion-medium is expanding in both the master cylinder and the slave cylinder, and the cold-expansion-medium of the master cylinder will start to be transferred into the slave cylinder after the slave piston has reciprocated over the TDC position; during this process, the coordinate-valve is actuated by the camshaft system.

FIG. 1H is the illustrative view of the two-stage-coordination type eight-stroke engine in the slave-exhaust-process at about 535 degree of crankshaft reference angle, wherein the cold-expansion-medium is expelled out of the slave cylinder through the slave-exhaust-port.

Figure 1A:
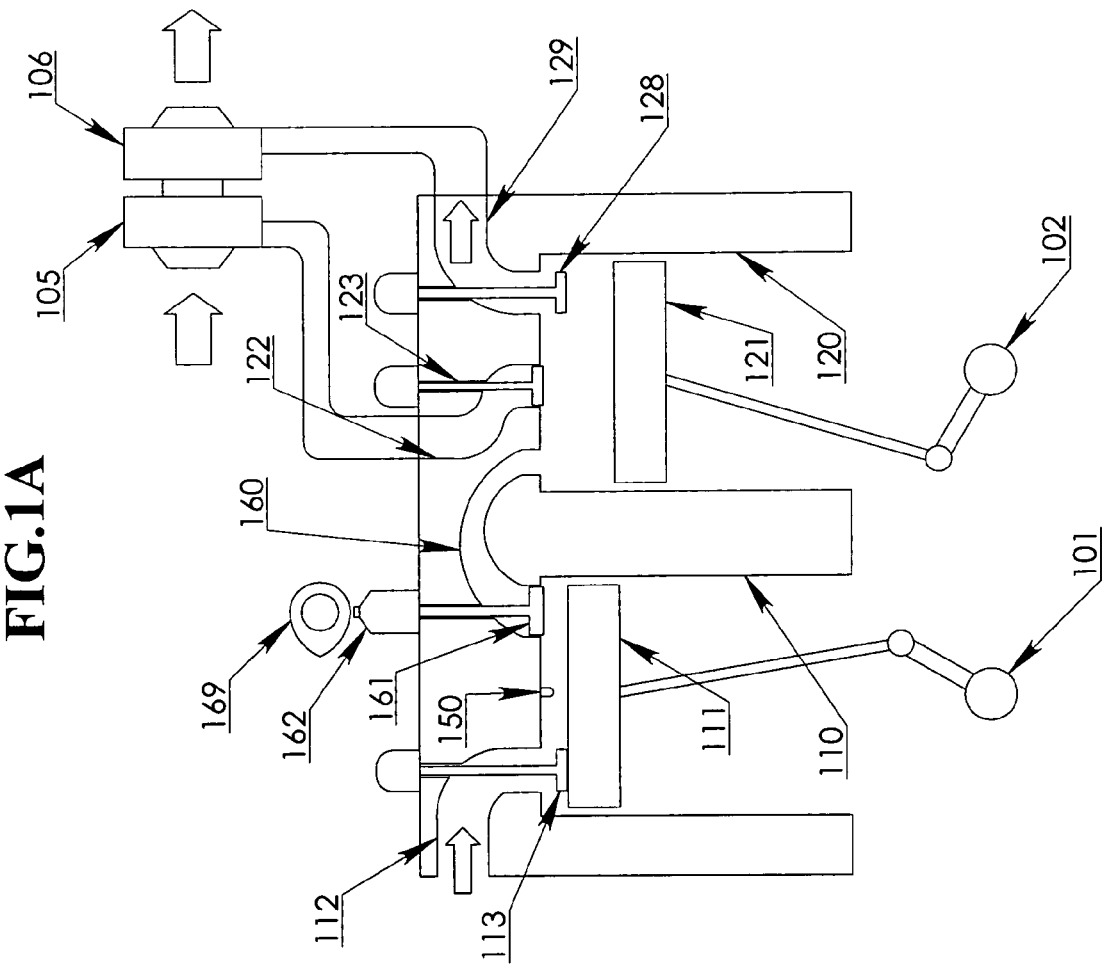

Operation Table.1L, Operation Table.1M, and Operation.Table1H shows changes in the process durations of the 8-process-sequence in difference load conditions, wherein the master piston and the slave piston are configured with 90 degree phase-difference; the shaded area after 6th process in the slave cylinder section indicates that the coordinate-valve has been shut by the spring-tension.

Operation Table.1L shows the relationship between the 8-stroke-operation and the 8-process-sequence in the light load operation, wherein the injection-process starts at about 390 degree of crankshaft reference angle, the coordinate-valve is shut between 420 degree and 450 degree of crankshaft reference angle.

Operation Table.1M shows the relationship between the 8-stroke-operation and the 8-process-sequence in the medium load operation, wherein the injection-process starts at about 420 degree of crankshaft reference angle, the coordinate-valve is shut between 440 degree and 450 degree of crankshaft reference angle.

Operation Table.1H shows the relationship between the 8-stroke-operation and the 8-process-sequence in the heavy load operation, wherein the injection-process starts at about 430 degree of crankshaft reference angle, the coordinate-valve is shut between 445 degree and 450 degree of crankshaft reference angle.

Operation Table.2L, Operation Table.2M, and Operation.Table2H show another configuration of the eight-stroke engine with a phase-difference of 120 degree in different load conditions.

Operation Table.2L shows the relationship between the 8-stroke-operation and the 8-process-sequence in the light load operation, wherein the injection-process starts at about 420 degree of crankshaft reference angle, the coordinate-valve is shut between 450 degree and 480 degree of crankshaft reference angle.

Operation Table.2M shows the relationship between the 8-stroke-operation and the 8-process-sequence in the medium load operation, wherein the injection-process starts at about 440 degree of crankshaft reference angle, the coordinate-valve is shut between 470 degree and 480 degree of crankshaft reference angle.

Operation Table.2H shows the relationship between the 8-stroke-operation and the 8-process-sequence in the heavy load operation, wherein the injection-process starts at about 450 degree of crankshaft reference angle, the coordinate-valve is shut between 475 degree and 480 degree of crankshaft reference angle.

DETAILED DESCRIPTION OF THE PREFERRED EMBODIMENTS

The two-stage-coordination type eight-stroke engine is an advanced eight-stroke engine developed from the eight-stroke internal combustion engine, which also operates on the basis of the eight-stroke-operation, the eight-stroke-operation consists of eight piston stroke performed by the master piston and the slave piston, which are the master-intake-stroke, the slave-intake-stroke, the master-compression-stroke, the slave-compression-stroke, the master-expansion-stroke, the slave-expansion-stroke, the master-exhaust-stroke, the slave-exhaust-stroke; however, to precisely describe the details of the eight-stroke-operation, the eight-stroke-operation will be elaborated with the 8-process-sequence, which describes the eight-stroke-operation in respect to the air flows in the master cylinder and the slave cylinder.

The master-intake-stroke, the master-expansion-stroke, the slave-intake-stroke and the slave-expansion-stroke are down-strokes; the master-compression-stroke, the master-exhaust-stroke, the slave-compression-stroke and the slave-exhaust-stroke are up-strokes.

The basic components of the two-stage-coordination type eight-stroke engine comprise a set of a master cylinder and a slave cylinder and a two-stage-coordination system; said master cylinder includes a master piston, said slave cylinder includes a slave piston, wherein said master piston and said slave piston must have a phase-difference between 60 degree and 150 degree to perform the 8-process-sequence.

Operation Table.1L, Operation Table.1M and Operation Table.1H demonstrate the relationship between the 8-process-sequence and the eight-stroke-operation with a phase-difference of 90 degree in different load conditions.

Operation Table.2L, Operation Table.2M and Operation Table.2H demonstrate another example of 8-process-sequence with a phase-difference of 120 degree in different load conditions.

It should be noted that the strokes mentioned in the eight-stroke-operation (such as the master-intake-stroke and the slave-intake-stroke) refers only to the downward motion or the upward motion of the master piston and the slave piston, the actual valve open-time or the air flow direction is defined with the 8-process-sequence; for example the master-intake-stroke is from 0 degree to 180 degree of crankshaft reference angle but the master-intake-process may be as long as 270 degree with the master-intake-valve being open from 0 degree to 270 degree; for another example, the master-exhaust-stroke is from 540 degree to 720 degree but the slave-exhaust-process of the eight-stroke engine is solely depending on the actuation time of the slave-exhaust-valve. As the air flow management is the major objective of the present invention, the present invention will mainly use 8-process-sequence to provide a better understanding of the eight-stroke engine.

The 8-process-sequence includes the master-intake-process, the slave-intake-process, the master-compression-process, the slave-compression-process, the hot-combustion-process, the injection-process, the cold-expansion-process, the slave-exhaust-process.

The first process is the master-intake-process, which is the process that the master-intake-valve opens to provide the air into the master cylinder.

The second process is the slave-intake-process, which is the process that the slave-intake-valve opens to provide the air into the slave cylinder.

The third process is the master-compression-process, which is the process that the master piston compresses the air in the master cylinder after the master-intake-valve is shut.

The fourth process is the slave-compression-process, which is the process that the slave piston compresses the air into the coordinate-port as a high-density-air; during this process, the coordinate-valve in the master cylinder is shut, and the air-pressure of the coordinate will continue to increase until the initiation of the injection process.

During the master-intake-process or the master-compression-process, the fuel will be provided into the master cylinder with the fuel-supplying means, said fuel-supplying means can be a fuel-injector, a carburetor, a fuel pump, a propane converter, or a direct-fuel-injection depending on the fuel type.

The fifth process is the hot-combustion-process, which is the process that the master cylinder ignites the air-fuel mixture with its associated ignition means (such as spark plugs or other currently available ignition methods), the ignition timing can be set at any point between 35 degree before the TDC of the master piston and 40 degree after the TDC of the master piston (for late ignition timing such as 40 degree after TDC position, all the following process will be shifted backward accordingly, and a larger phase-difference configuration is generally required).

The hot-combustion-process will combust an air-fuel mixture as a hot-combustion-medium in the master cylinder while the coordinate-valve in the master cylinder is shut before the initiation of the injection-process; as the master piston reciprocates downward to allow the pressure of the hot-combustion-medium to decrease, and the slave piston reciprocates upward to increase the air-pressure in the coordinate-port, the air-pressure of the high-density-air in the coordinate-port will eventually increase to a point high enough to overcome the combined force of the spring-tension on the coordinate-valve and the combustion pressure of the hot-combustion-medium in the master cylinder, the air-pressure at this point is also referred to as the threshold pressure of the injection-process.

The sixth process is the injection-process, which is the process that the high-density-air of the coordinate-port is injected into the master cylinder after the threshold pressure is obtained in the coordinate-port; this process is relatively short in comparison to that of the original eight-stroke engine as the coordinate-valve will be shut immediately after the injection of the high-density-air to prevent the backfiring into the coordinate-port; during this process the high-density-air and the hot-combustion-medium will be mixed to form a cold-expansion-medium, thereby reducing the overall temperature in the master cylinder and speeding up the conversion rate of the carbon monoxide to carbon dioxide.

To describe this process more precisely, assuming the condition that the engine running in 2000 rpm with medium load, the pressure of the hot-combustion-medium drops to 200 psi (pound per square inch) at 400 degree of crankshaft reference angle, and the high-density-air of the coordinate-port raises to 250 psi at 400 degree of crankshaft reference angle, and the spring of coordinate-valve requires 50 psi to be actuated, then the high-density-air of the coordinate-port will start to be injected into the master cylinder at 400 degree of crankshaft reference angle for a duration of about 20 degree of crankshaft rotation, and the coordinate-valve will immediately be pulled back to the shut position with the spring tension, thus finishing the injection-process in about 1.7 millisecond at 420 degree of crankshaft reference angle (this open-time of the coordinate-port is only approximated for the demonstration purpose, the actual value can vary from 5 degree to 60 degree of crankshaft rotation due to different rpm and combustion condition and spring configurations); by shutting the coordinate-valve immediately after the injection-process, the high-density-air and the hot-combustion-medium will be mixed in a concealed environment within the master cylinder during 420 degree to 450 degree of crankshaft reference angle.

Since the combustion temperature and the combustion pressure will sharply increase due to the sudden addition of the oxygen content of the high-density-air during the injection-process, the coordinate-valve should be shut before the backfiring occurs, as these surges in combustion temperature and combustion pressure will cause excessive heat loss and damage the coordinate-port structure.

The initiation timing of the injection-process can occur at any point between 30 degree after the TDC of the master piston (the master-expansion-stroke) and 30 degree before the TDC of the slave piston (the slave-compression-stroke); in other words, the coordinate-valve may start to open between the first 30 degree of the master-expansion-stroke and the last 30 degree of the slave-compression-stroke; wherein the minimum open-time should be at least 5 degree of crankshaft rotation.

In Operation Table.1L, Operation Table.1M and Operation Table.1H, the eight-stroke engine is configured with a 90 degree phase-difference, so the possible initiation timing of the injection-process can range from 390 degree to 420 degree of crankshaft reference angle.

In Operation Table.2L, Operation Table.2M and Operation Table.2H, the engine is configured with a 120 degree phase-difference, so the possible initiation timing of the injection-process can range from 390 degree to 450 degree of crankshaft reference angle. The variation of the initiation timing of the injection-process will also depend on the combustion condition in the master cylinder and the compression condition in the slave cylinder and the spring-tension on the coordinate-valve.

A tension-adjustable spring is preferable to be used for the coordinate-valve, and therefore, many types of spring can be employed for different applications, such as air-spring, electromagnetic-controlled-spring, hydraulic spring, and the mechanical spring; generally, during the high speed operation, the spring-tension should be increased accordingly to maintain a fast response of shut action after the injection-process.

The seventh process is the cold-expansion-process, which is the process that the cold-expansion-medium expands in both the master cylinder and the slave cylinder, the coordinate-valve will be opened again with the camshaft system from approximately the TDC position of the slave piston (the slave-expansion-stroke) to the TDC position of the master piston (the master exhaust stroke), which establishes a direct flow passage from the master cylinder to the slave cylinder to allow the cold-expansion-medium to expand in both the master cylinder and the slave cylinder.

An optional catalytic converter can be included in the coordinate-port for improving the efficiency of the cold-expansion-process.

The camshaft system may delay the actuation timing of the coordinate-valve to as far as 45 degree after the slave piston has started the slave-expansion-stroke, which allows a more complete mixing of the high-density-air and the hot-combustion-medium in the master cylinder before expanding back into the slave cylinder (this delay of the actuation timing is required for most high speed type eight-stroke engine); however, it is found that the highest efficiency is usually achieved with an actuation timing between the first 10 degree and the first 30 degree of the slave-expansion-stroke.

The eighth process is the slave-exhaust-process, which is the process that the cold-expansion-medium is being expelled out of the slave cylinder with a slave-exhaust-valve during the later part of the slave-expansion-stroke and the entire duration of the slave-exhaust-stroke.

The major improvement of the present invention on the eight-stroke-operation is the two-stage-coordination for controlling the air-flows, the coordinate-valve is opened two times in each round of the eight-stroke-operation, the coordinate-valve is opened for the first time with the force exerted by the high-density-air at the threshold pressure, next the coordinate-valve is opened for the second time with a camshaft system, which will allow a complete mixing of the high-density-air and the hot-combustion-medium in the master cylinder, thereby increasing the overall fuel efficiency in heavy load operation and enhancing the response time of the coordinate-valve to the load changes and the engine rpm changes.

For the basic configuration as in the first embodiment, almost all the cold-expansion-medium in the master cylinder is transferred into the slave cylinder to be expelled through the slave-exhaust-port (a portion is remained due to the required compression ratio of the master cylinder).

For the advanced configuration used in the high speed engine applications, an auxiliary exhaust valve can be installed in the master cylinder, which can be actuated to open in the range from 540 degree to 720 degree of crankshaft reference angle to reduce the pumping loss and the heat loss through the coordinate-port during the slave-exhaust-process.

Now referring to FIG. 1A to FIG. 1H for the structural description of the first embodiment, the basic components of the two-stage-coordination type eight-stroke engine are labeled as follows, the master crankshaft 101, the slave crankshaft 102, the master-intake-port 112, the master-intake-valve 113, the master piston 111, the master cylinder 110, the ignition means 150, the slave-intake-valve 123, the slave-intake-port 122, the slave-exhaust-port 129, the slave-exhaust-valve 123, the slave piston 121, the slave cylinder 120, the coordinate-port 160, the coordinate-valve 161, the coordinate-spring-adjuster 162, the camshaft system 169, the compressor 105 of the turbocharger system, the turbine 106 of the turbocharger system.

The fuel-supplying means of the master cylinder is not shown in FIG. 1A to FIG. 1H for clarification purpose, as the fuel-supplying means can be a carburetor, a fuel injector, a fuel pump, a converter (propane type), or a direct-injection nozzle depending on the fuel types; the fuel used by the eight-stroke engine can be gasoline, diesel, natural gas, or methanol.

The first embodiment is based on the configuration of 90 degree phase difference, it should be noted that the phase-difference can vary from 60 degree to 150 degree to perform the 8-process-sequence while sustaining a reasonable fuel efficiency over 35%; the 8-process-sequence in accordance with FIG. 1A to FIG. 1H is shown in Operation Table.1M for general medium load operation.

As shown in FIG. 1A the eight-stroke engine is in the beginning of the master-intake-process at about 30 degree of crankshaft reference angle, the master piston 111 is moving downward, the master-intake-valve 113 is open to admit the air into the master cylinder 110, the slave piston 121 is moving upward to expel the cold-expansion-medium of the last round of the eight-stroke-operation.

Figure 1B:
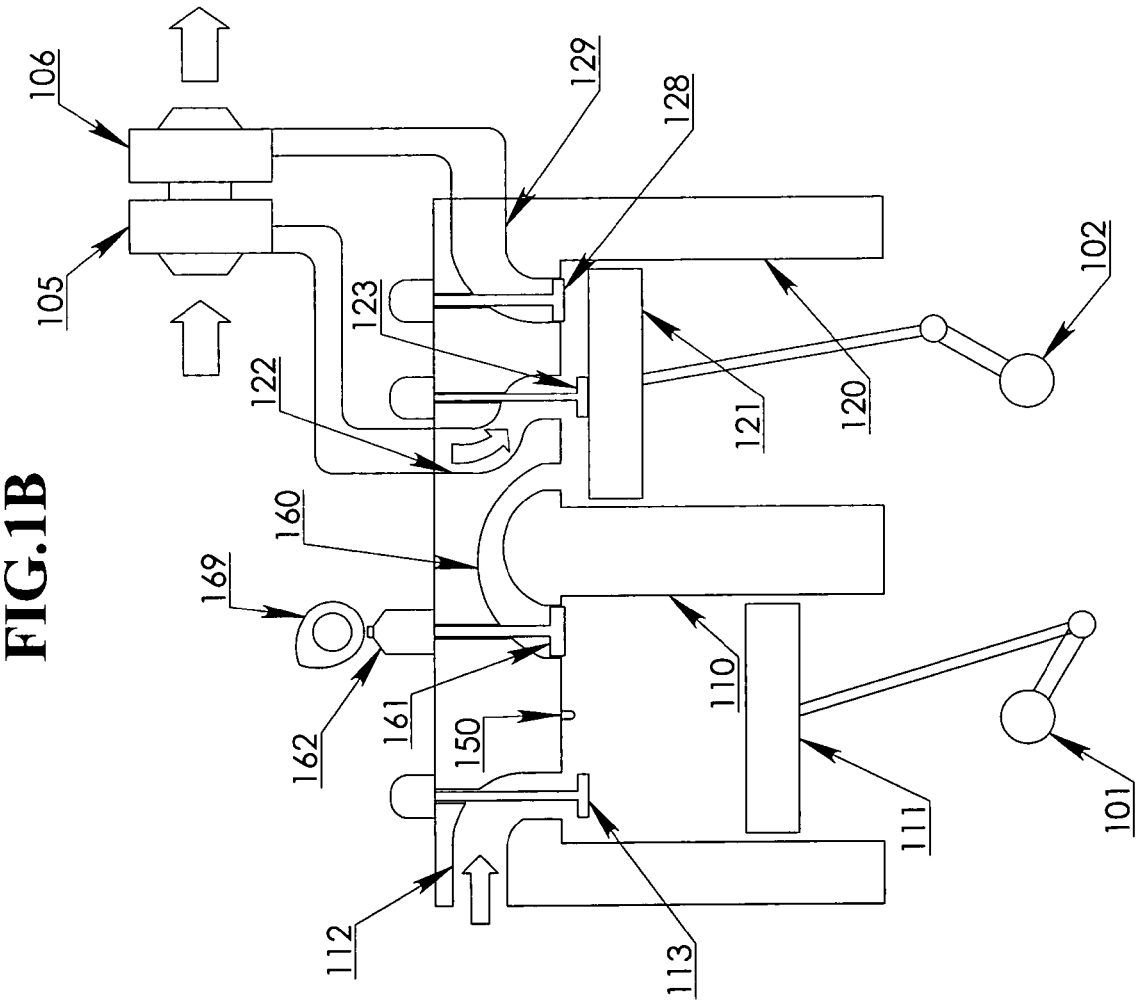

As shown in FIG. 1B the eight-stroke engine is in the beginning of the slave-intake-process at about 120 degree of crankshaft reference angle, the slave piston 121 is moving downward, the slave-intake-valve 122 is open to admit the air into the slave cylinder 120, the master cylinder 110 is in the later stage of the master-intake-process.

Figure 1C:
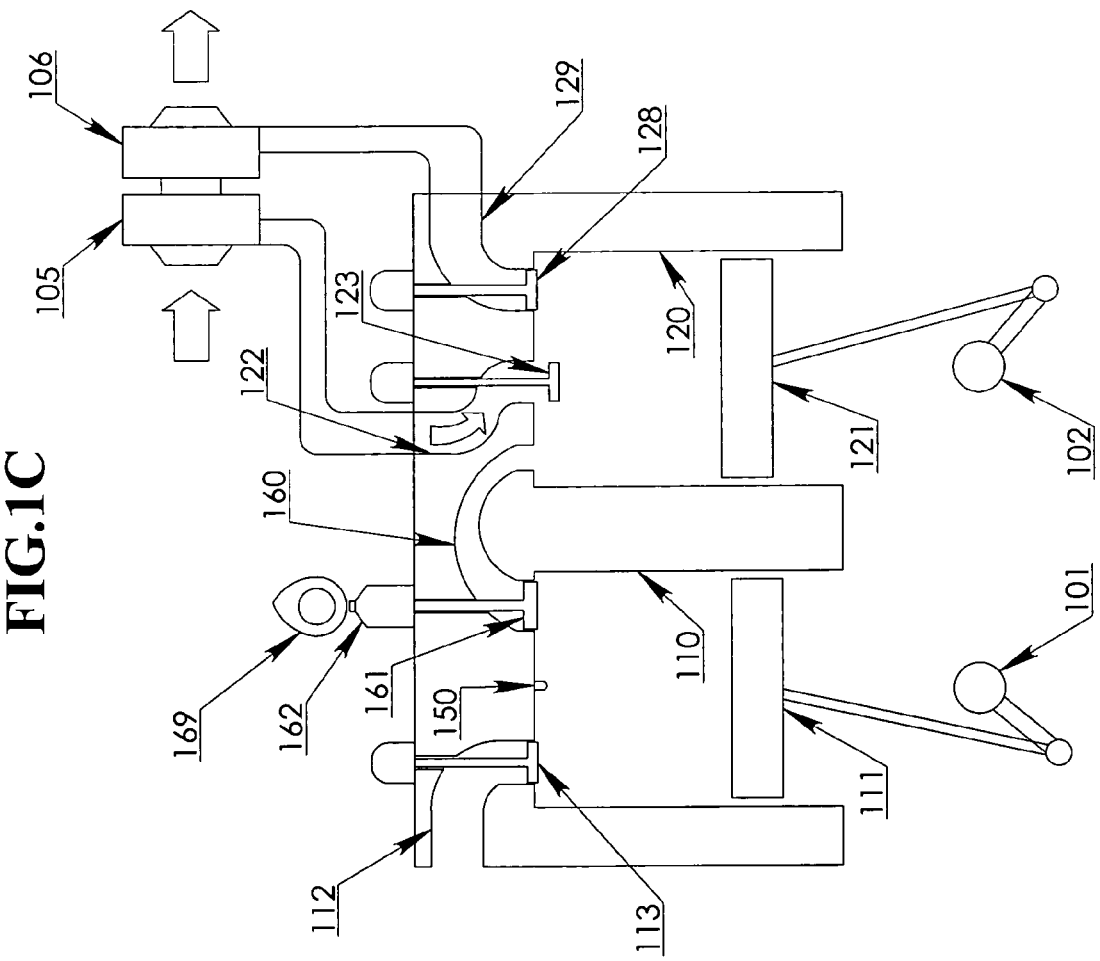

As shown in FIG. 1C the eight-stroke engine is in the beginning of the master-compression-process at about 220 degree of crankshaft reference angle, the master-intake-valve 113 is shut, the coordinate-valve 161 is shut, and the air in the master cylinder 110 is compressed with the master piston 111.

Figure 1D:
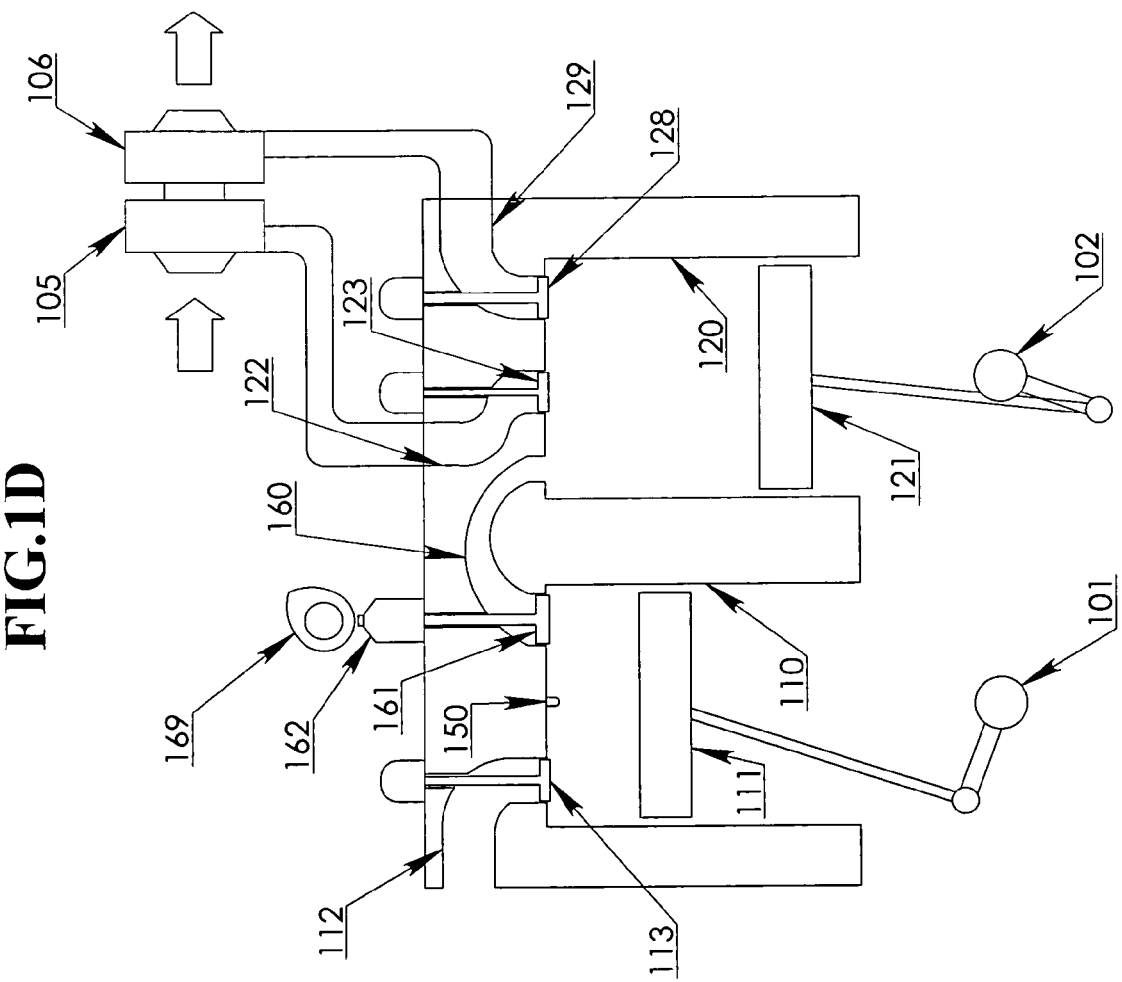

As shown in FIG. 1D the eight-stroke engine is in the beginning of the slave-compression-process at about 290 degree of crankshaft reference angle, the slave-intake-valve 123 is shut, as the slave cylinder 120 has a direct flow passage to the coordinate-port 160, the air of the slave cylinder 120 is compressed into the coordinate-port 160 as a high-density-air during this process.

Figure 1E:
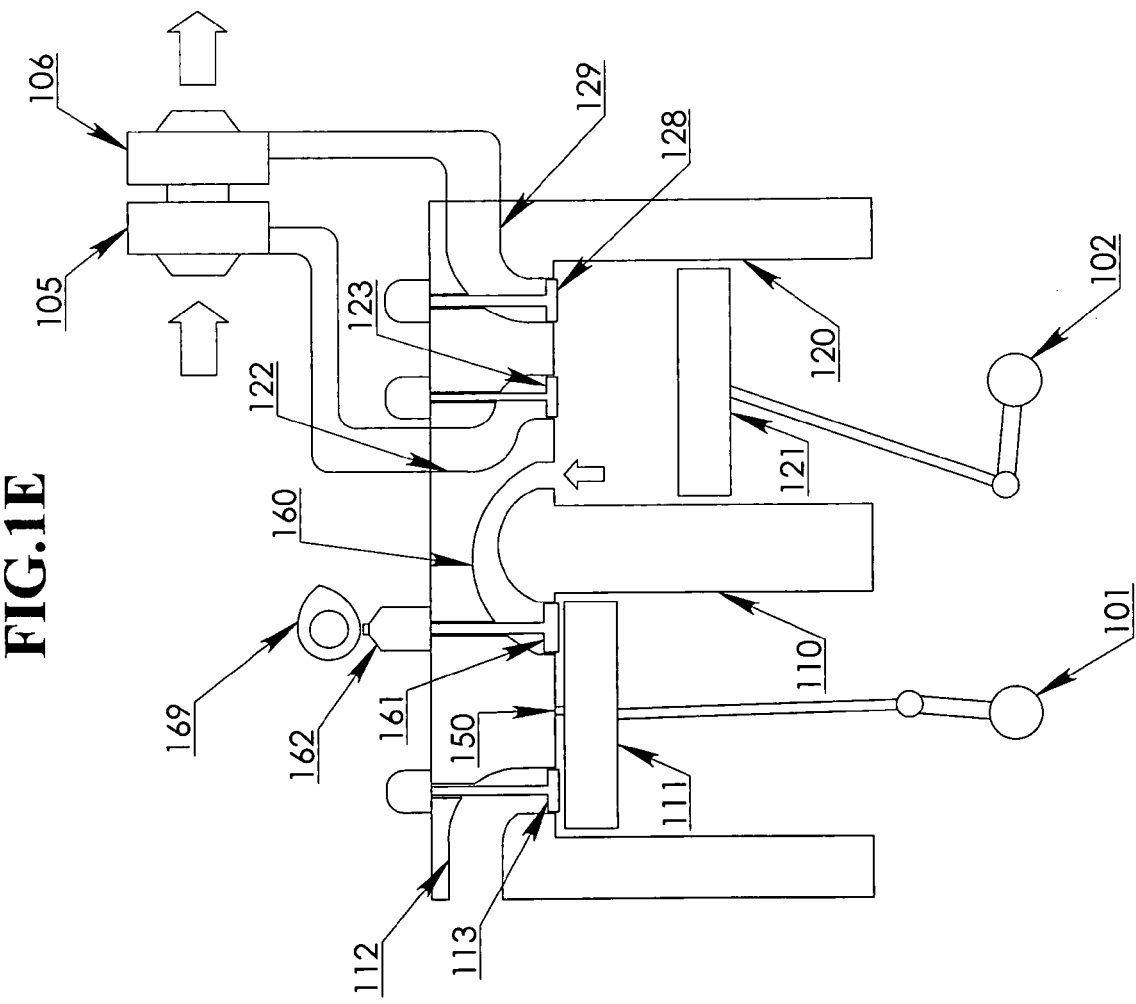

As shown in FIG. 1E the eight-stroke engine is in the beginning of the hot-combustion-process at about 365 degree of the crankshaft reference angle, an air-fuel mixture is combusting in the master cylinder 110 as a hot-combustion-medium, while the coordinate-port 160 will continue to increase the air-pressure therein until the threshold pressure of the initiation of the injection process is obtained in the coordinate-port.

The threshold pressure of the initiation of the injection process is defined as the air-pressure that is sufficient to overcome the spring-tension on the coordinate-valve 161 and the combustion pressure of the hot-combustion-medium.

FIG. 1F.*start* is the illustrative view of the eight-stroke engine at the initiation point of the injection-process, FIG. 1F.*end* is the illustrative view of the eight-stroke engine at the end point of the injection-process, it can be observed from FIG. 1F.*start* that the coordinate-valve 161 is only actuated by the abovementioned pressure difference.

As shown in FIG. 1F.*start* the eight-stroke engine is in the beginning of the injection-process at about 420 degree of crankshaft reference angle, the high-density-air in the coordinate-port 160 will be injected into the master cylinder 110 to mix with hot-combustion-medium to form a cold-expansion-medium; the coordinate-valve 161 is opened with the force exerted by the high-density-air, and then the coordinate-valve 161 will be shut immediately after the air-pressure of the coordinate-port drops to lower than the combined force of the spring tension and the pressure in the master cylinder (FIG. 1F.*end* shows the valve condition at 440 degree of crankshaft reference angle); the open-time of the coordinate-valve in the injection-process may range from 5 degree to 60 degree of crankshaft rotation; it should be noted that the initiation timing of the injection-process can vary significantly with different load conditions for the same engine configuration, this can be observed from the difference between Operation Table.1 L and Operation Table.1H.

The coordinate-spring-adjuster 162 is used to adjust the spring tension of the coordinate-valve 161 to optimize the initiation timing and the open-time of the coordinate-valve during the injection-process; however, for the low cost design with less efficiency requirement, this coordinate-spring-adjuster can be optional.

Figure 1G:
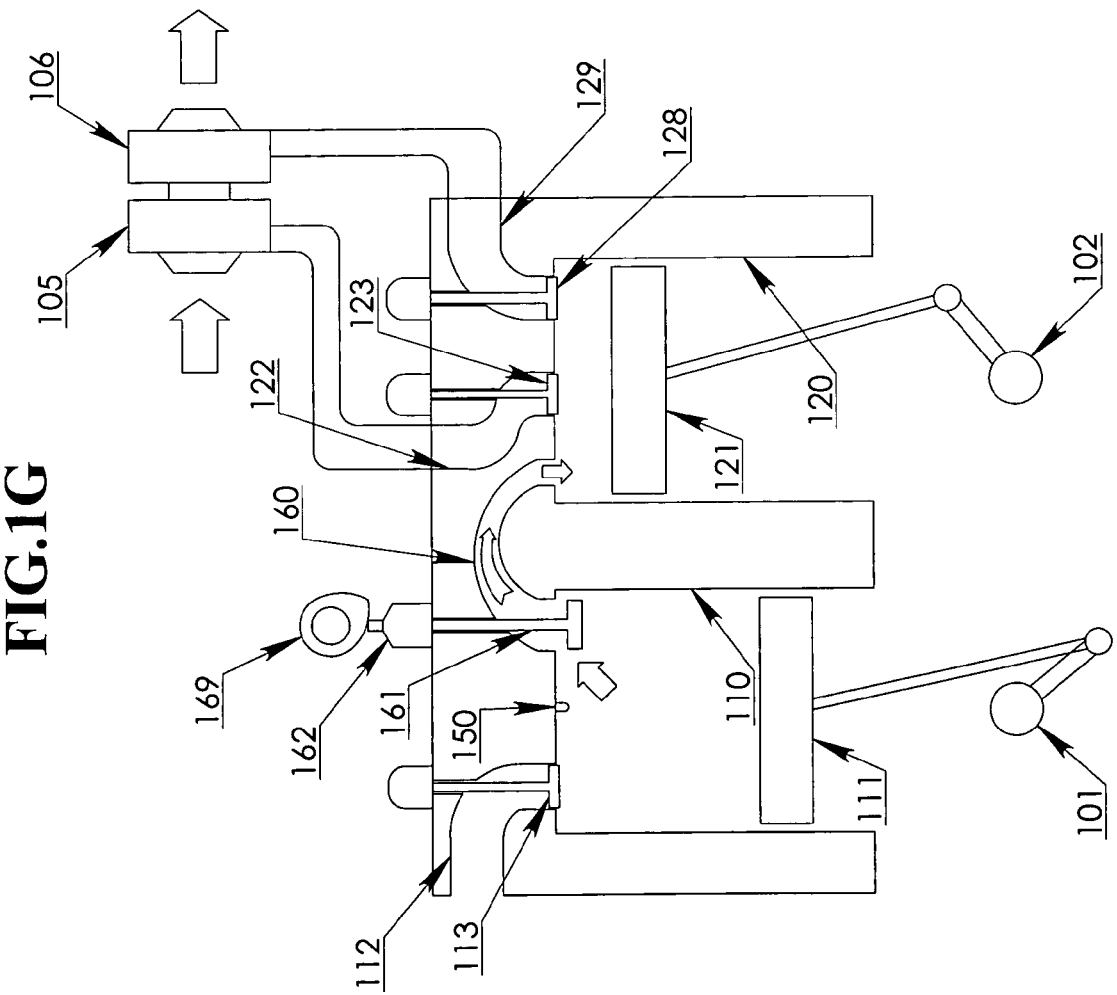

As shown in FIG. 1G the eight-stroke engine is in the beginning of the cold-expansion-process at about 460 degree of crankshaft reference angle, the cold-expansion-medium will then expand in both the master cylinder 110 and the slave cylinder 120 after the coordinate-valve 161 is opened again with the camshaft system 169.

During the cold-expansion-process, the coordinate-valve 161 is required to open for at least 120 degree of crankshaft rotation between the TDC position of the slave piston (the slave-expansion-stroke) and the TDC position of the master piston (the master-exhaust-stroke).

Figure 1H:
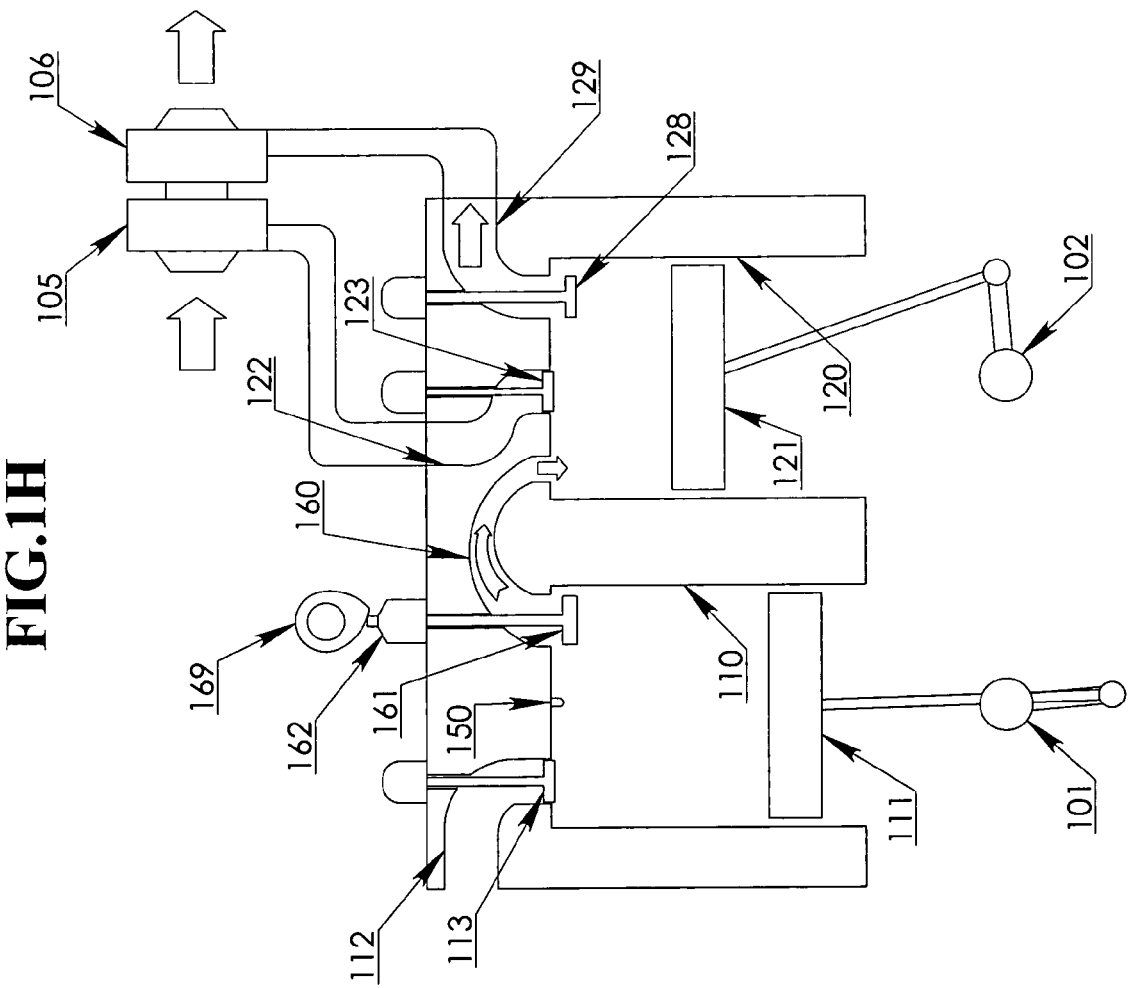

As shown in FIG. 1H the eight-stroke engine is in the beginning of the slave-exhaust-process at about 535 degree of crankshaft reference angle (the slave-exhaust-valve 123 may open in the range from 520 degree of crankshaft reference angle to the end of the slave-exhaust-stroke); during this process, the cold-expansion-medium is expelled out of the slave cylinder through the slave-exhaust-port 129.

The camshaft system 169 used for opening the coordinate-valve 161 during the cold-expansion-process and the slave-exhaust-process can be substituted with a high speed hydraulic actuator, an electric servo-actuator to improve the adaptability, wherein the coordinate-valve 161 will still be opened with the force exerted by the high-density-air to initiate the injection-process.

For the best mode configuration, the eight-stroke engine will be configured with the turbocharger system as in FIG. 1A to FIG. 1H, wherein the cold-expansion-medium expelled from the slave cylinder is charged into the turbine 106 of the turbocharger system, the ambient air is pressurized with the compressor 105 of the turbocharger system, and a flow of pressurized air is charged into the slave-intake-port 122 to raise the intake pressure of the slave cylinder 120 during the slave-intake-process.

The major difference between the conventional eight-stroke engine and the present invention is that the coordinate-valve is opened twice to enhance the cooling effect, the first time is opened and shut by the pressure difference before the slave piston 121 has completed the slave-compression-stroke, the second time is opened with the camshaft system after the slave piston 121 has started the slave-expansion-stroke.

In contrast, the conventional eight-stroke engine is opened with camshaft for only once, in this case, the coordinate-port and the coordinate-valve of the conventional eight-stroke engine requires to sustain the sudden pressure raise during the mixing of the high-density-air and the hot-combustion-medium because the coordinate-port is not shut immediately after the injection of the high-density-air, this causes the pressure in the coordinate-port to be lower than the pressure in the master cylinder after the injection of the high-density-air, and the flame front of the hot-combustion-medium in the master cylinder will directly charge into the coordinate-port (this is referred as backfiring effect for the eight-stroke engine, the backfiring effect will cause the coordinate-port and the coordinate-valve to be heated up with a flow of hot-combustion-medium over 1000 degree Celsius), therefore, resulting in excessive heat loss in the coordinate-port and damage to the coordinate-valve due to overheating; by implementing the two-stage-coordination method of the present invention, the average operating temperature of the coordinate-valve 161 can be maintained below 300 degree Celsius even in heavy load operation, this is because the hot-combustion-medium and the high-density-air are completely mixed during the injection-process, therefore the cold-expansion-medium is only about 400 degree to 800 degree Celsius when flowing through the coordinate-port during the cold-expansion-process.

Now comparing the initiation timing of the injection-process in different load conditions with the reference to Operation Table.1L and Operation Table.1H; in the case of the light load operation presented in Operation Table.1L, the injection-process is initiated at 390 degree of crankshaft reference angle and ended at 420 degree of crankshaft reference angle in the light load operation, in other words, the air-pressure in the coordinate-port 160 reaches the threshold pressure at 390 degree, and the high-density-air will be injected from 390 degree to 420 degree of crankshaft reference angle, and the coordinate-valve 161 is shut between 420 degree and 450 degree of crankshaft reference angle to prevent the backfiring effect; in contrast to the heavy load operation presented in Operation Table.1H, the injection-process is initiated at 430 degree of crankshaft reference angle and ended at 445 degree of crankshaft reference angle, in other words, the air-pressure in the coordinate-port 160 reaches the threshold pressure at 430 degree of crankshaft reference angle, and the high-density-air will be injected from 430 degree to 445 degree of crankshaft reference angle, and the coordinate-valve 161 is shut between 445 degree and 450 degree of crankshaft reference angle to prevent the backfiring effect. It can be observed that the initiation timing of the injection-process changes with different engine load, as the combustion pressure of the master cylinder in the light load operation can decrease to as low as 100 psi (pound per square inch) at 390 degree of crankshaft reference angle (this pressure valve can be even lower with Atkinson type engine or lean burn type engine), whereas the combustion pressure of the master cylinder can also be as high as 400 psi even at 430 degree of crankshaft reference in the heavy load operation.

Another example of the changes in the initiation timing of the injection-process is shown in Operation Table.2L, Operation Table.2M and Operation Table.2H, wherein the eight-stroke engine is configured with a phase-difference of 120 degree; the concept of the injection-process is the same, the injection-process can only start after the coordinate-port has obtained the threshold pressure.

Besides the basic single crankshaft configuration and the double crankshaft configuration of the eight-stroke engine, many other various cylinder arrangements can be employed with the two-stage-coordination type eight-stroke engine, the master piston and the slave-piston can be connected with single crankshaft or two separate crankshafts coupled to synchronize the rotation speed with gears.

Figure 3:
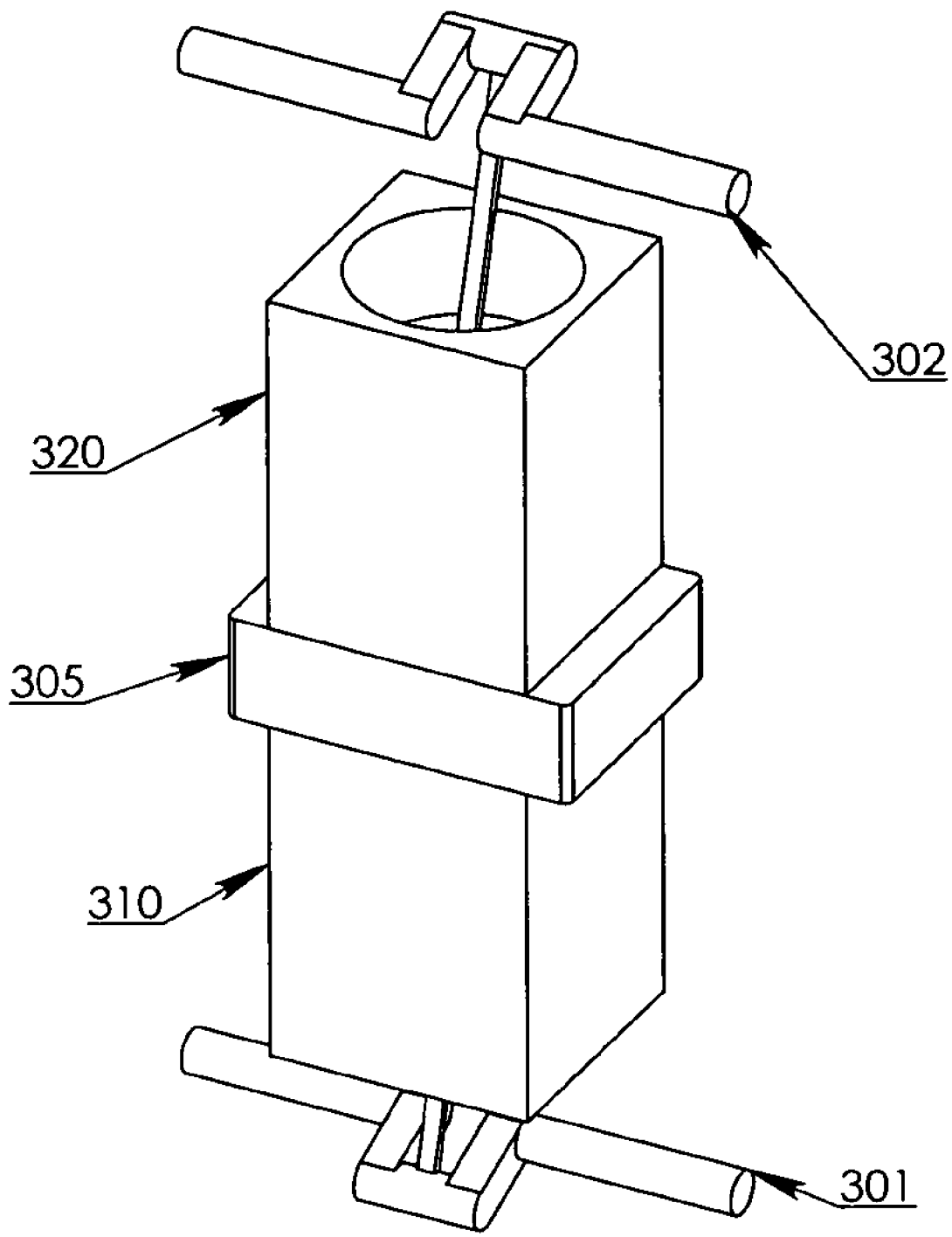
FIG. 3 shows an advanced configuration of the eight-stroke engine, the flat-type eight-stroke engine, wherein the master cylinder and the slave cylinder are reciprocating toward each other, thereby reducing the pumping loss during the cold-expansion-process and the slave-exhaust-process to increase fuel efficiency.

An example of the alternative cylinder arrangements is to dispose master cylinder and the slave cylinder so that the master piston and the slave piston will reciprocate towards each other as in the flat-type cylinder arrangement shown in FIG. 3, the components are labeled as the master crankshaft 301, the slave crankshaft 302, the master cylinder block 310, the slave cylinder block 320, the engine head 305; wherein the cold-expansion-medium can expand with minimum pumping loss during the cold-expansion-process and the slave-exhaust-process.

Figure 4:
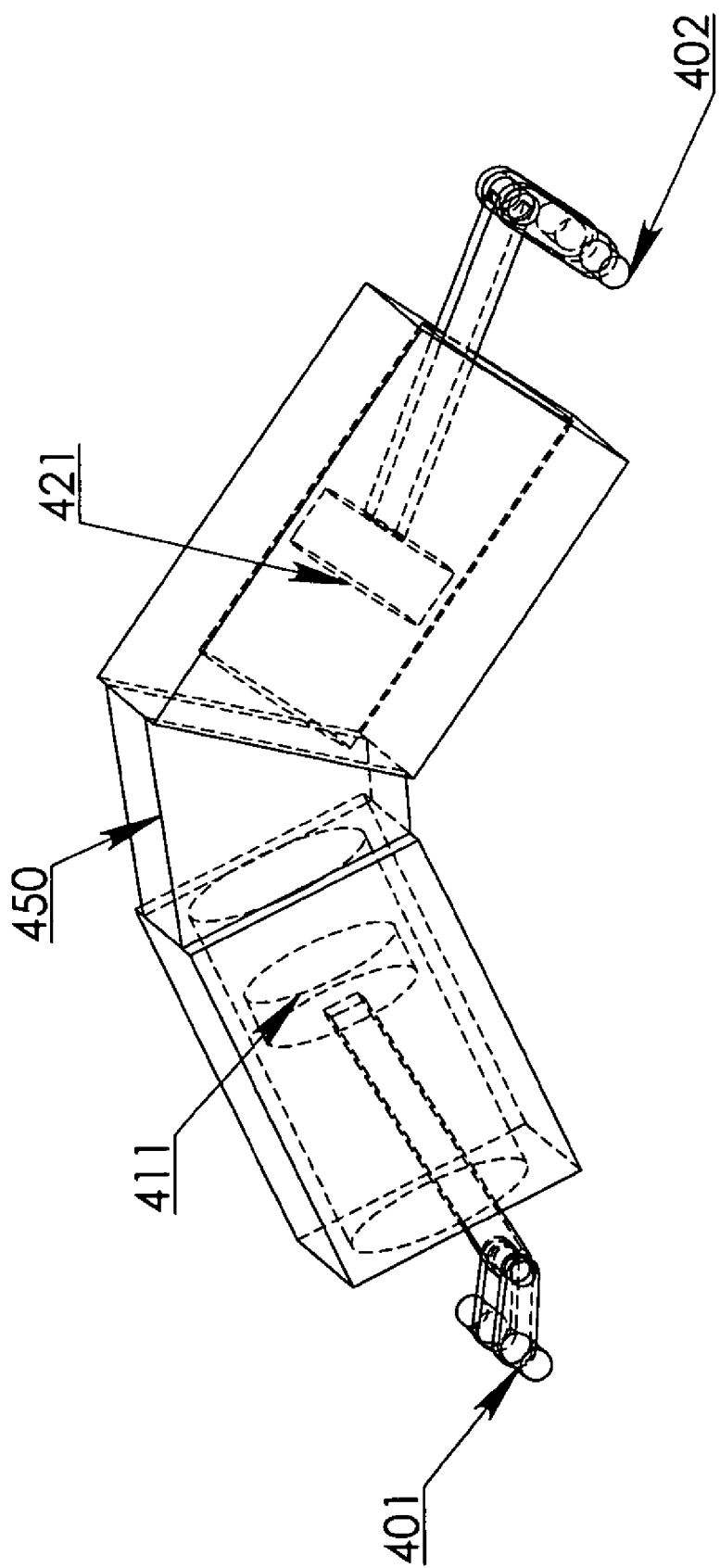
FIG. 4 shows the A-type eight-stroke engine, wherein an inline block of the master cylinders and an inline block of the slave cylinders are disposed at an angle, the master crankshaft and the slave crankshaft are coupled with chains and gears to rotate at the same speed.

An A-type cylinder arrangement can be constructed for the eight-stroke engine as shown in FIG. 4, wherein the master cylinder and the slave cylinder are disposed at an angle and the master piston 411 and the slave piston 421 will reciprocate toward each other to perform the eight-stroke-operation, the master crankshaft 401 and the slave crankshaft 402 will be connected with gears to synchronize the rotational speed, the engine head 450 will include all of the slave-exhaust-means, the master-intake-means, the slave-intake-means, the coordinate-port, and the camshaft system.

An alternating-inline cylinder arrangement can be constructed for reducing vibration resonance, wherein two crankshaft are used, and each of the crankshaft is connected the master cylinder and the slave cylinder in the alternating order; for example with a 4-set eight-stroke engine, the first master cylinder and the third master cylinder and the second slave cylinder and the fourth slave cylinder are connected the first crankshaft, whereas, the second master cylinder and the fourth master cylinder and the first slave cylinder and the third slave cylinder are connected to the second crankshaft.

Figure 5:
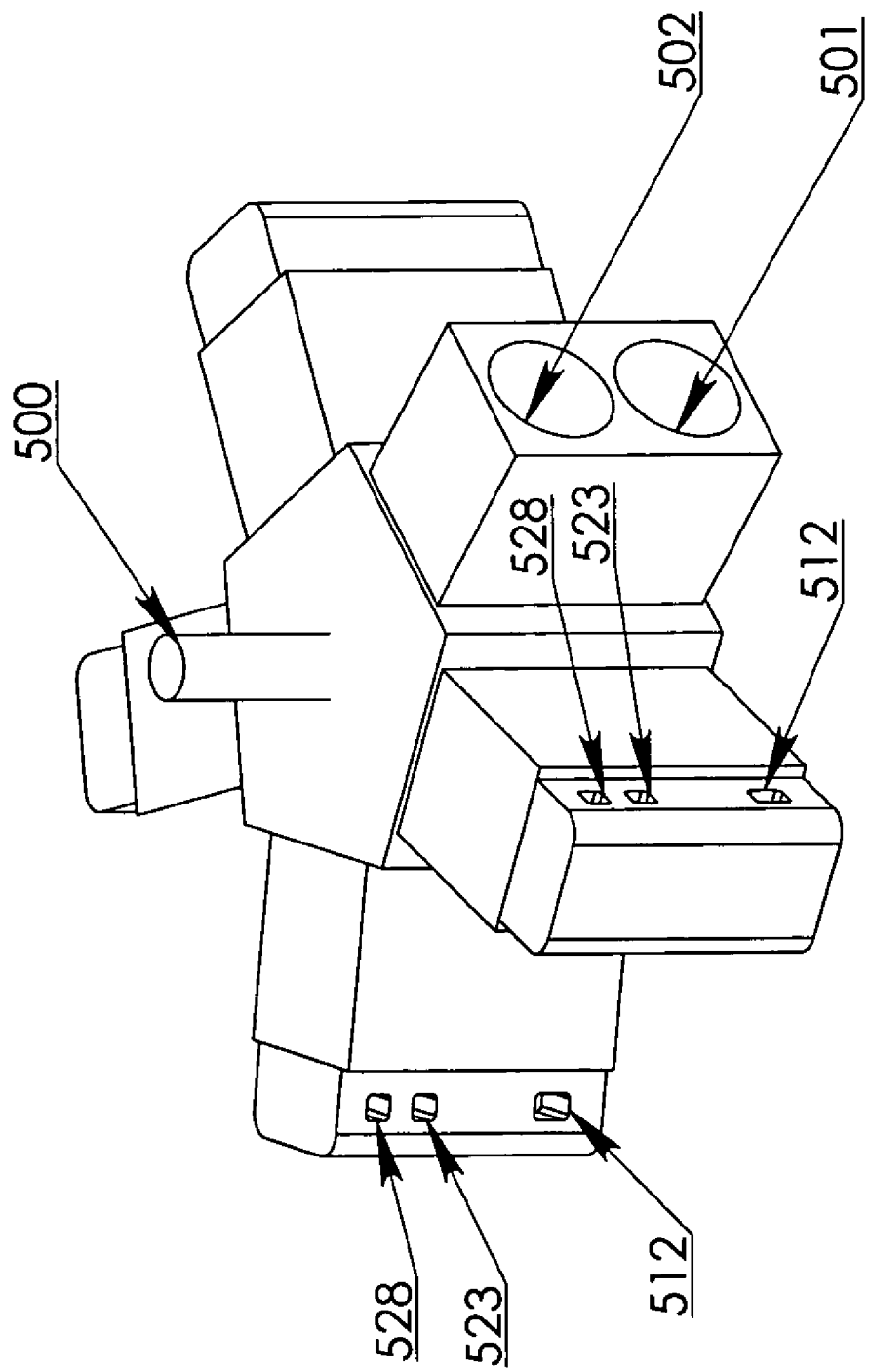
FIG. 5 shows an alternative cylinder arrangement of the eight-stroke engine, the radial type eight-stroke engine; wherein the mechanical loss and the engine vibration can be greatly reduced.

An example of the radial type eight-stroke engine is demonstrated in FIG. 5, wherein 5 sets of master cylinders 501 and slave cylinders 502 are arranged in radial configuration to share the crankshaft 500; the components are labeled as the crankshaft 500, the master cylinder 501, the slave cylinder 502, the master-intake-port 512, the slave-intake-port 523, the slave-exhaust-port 528.

A turbo-charger system can employed with the two-stage-coordination type eight-stroke engine, wherein the turbine of the turbo-charger utilizes the exhaust air from the slave-exhaust-port, and the compressor of the turbo-charger charges a flow of pressurized air into the slave-intake-port for charging the slave cylinder during the slave-intake-process.

Figure 2:
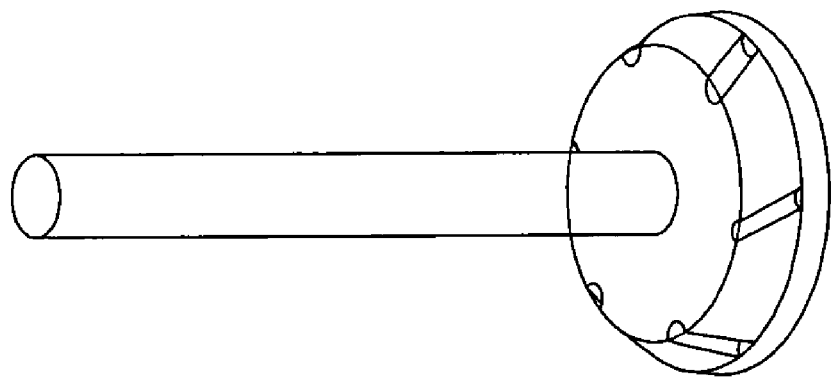
FIG. 2 shows an example of the coordinate-valve with air-guiding-grooves, the high-density-air of the coordinate-port will be guided with the air-guiding-grooves to be injected in multi-directions during the injection-process.

The coordinate-valve are preferably to constructed with air-guiding-grooves, as shown in FIG. 2, to inject the high-density-air in multi-directions during the injection-process, which can further speed up the mixing of the high-density-air and the hot-combustion-medium in the master cylinder.

Figure 1I:
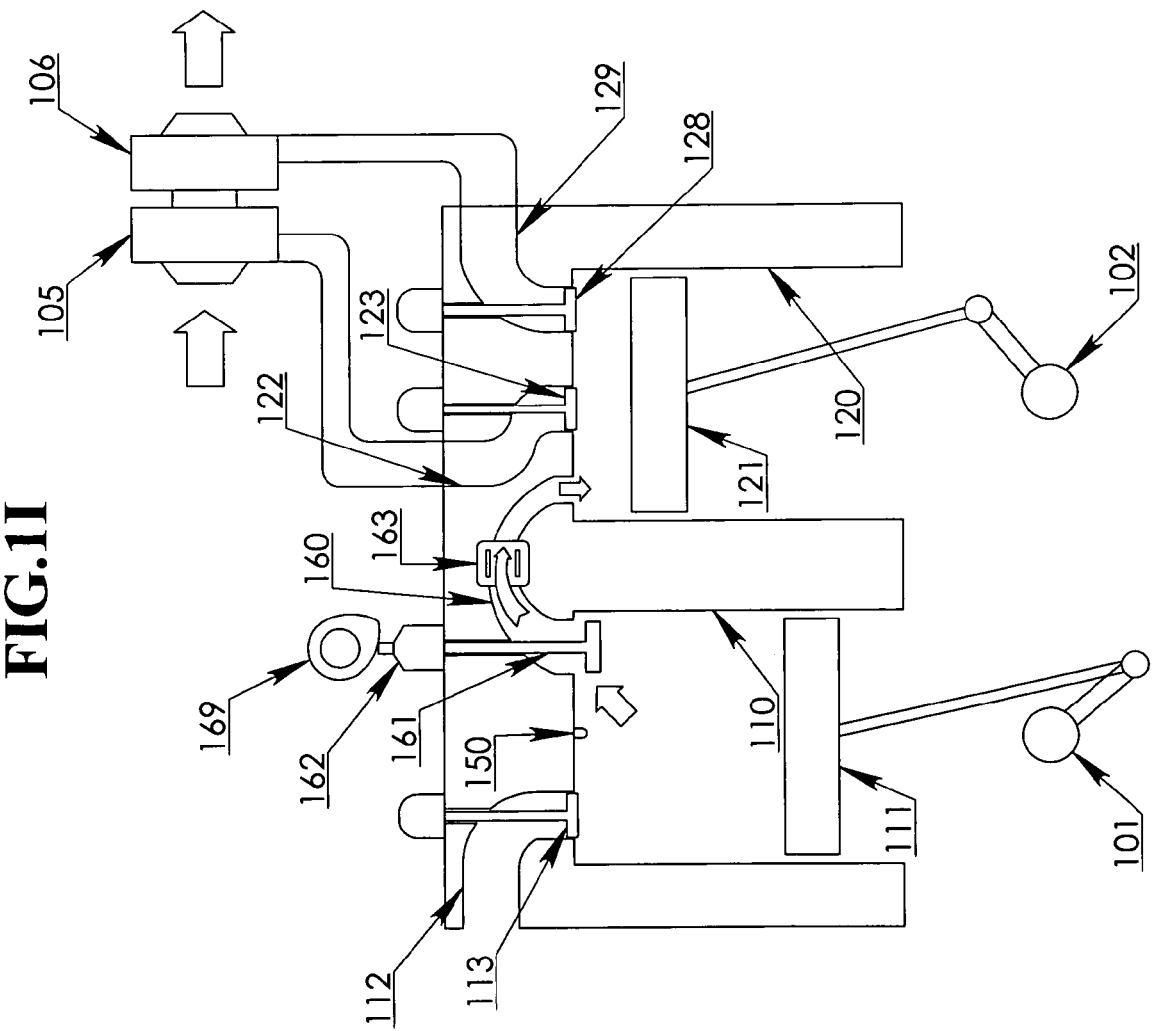
FIG. 1I shows an eight-stroke engine with built-in catalytic converter in the reverse-channel for increasing the expansion efficiency of the cold-expansion-process and reducing the pollution in light load operation.

For the light load operation, due to the low temperature characteristic of the cold-expansion-process, a build-in catalytic converter can be included in the coordinate-port as shown in FIG. 1I.

In the heavy load operation, wherein the high-density-air from the coordinate-port and the hot-combustion-medium in the master cylinder requires more time to complete the mixing the process to form a cold-expansion-medium, the actuation of the coordinate-valve by the camshaft system (the second opening of the coordinate-valve in each round of eight-stroke-operation) can be delayed up to 45 degree of crankshaft rotation to improve the fuel efficiency.

For the two-stage-coordination type eight-stroke engine equipped with turbo-charger system to boost the intake pressure of the slave-intake-process, the master cylinder can further include an auxiliary-exhaust-valve to expel the cold-expansion-medium directly to the turbine (105) of said turbo-charger system during the master-exhaust-stroke to reduce the overall pumping loss.

Many other possible embodiments may be constructed based on the elements set forth in the claims and should still be considered within the scope of the present invention.

Operation Table.1L
8-stroke operation configured with 90 degree phase-difference in light load condition

| Master Cylinder | 1st* (FIG. 1A) | | 3rd* (FIG. 1C) | | 5th* | 6th* | 7th* (FIG. 1G) | | 8th* (FIG. 1H) | | 1st* |
|---|---|---|---|---|---|---|---|---|---|---|---|
| | master-intake-stroke | | master-compression-stroke | | | | master-expansion-stroke | | master-exhaust-stroke | | |
| Slave Cylinder | 8th* | 2nd* (FIG. 1B) | | 4th* (FIG. 1D) | | 6th* | 7th* (FIG. 1G) | | 8th* (FIG. 1H) | | |
| | | slave-intake-stroke | | slave-compression-stroke | | | slave-expansion-stroke | | slave-exhaust-stroke | | |
| Crankshaft Reference Angle | 0 | 90 | 180 | 270 | 360 | 450 | 540 | 630 | 720 | 810 | |

First round of 8-process-sequence note:
1st = the master-intake-process (FIG. 1A)
2nd = the slave-intake-process (FIG. 1B)
3rd = the master-compression-process (FIG. 1C)
4th = the slave-compression-process (FIG. 1D)
5th = the hot-combustion-process (FIG. 1E)
6th = the injection-process
7th = the cold-expansion-process (FIG. 1G)
8th = the slave-exhausst-process (FIG. 1H)

Operation Table.1M
8-stroke operation configured with 90 degree phase-difference in medium load condition

| Master Cylinder | 1st* (FIG. 1A) | | 3rd* (FIG. 1C) | | 5th* | 6th* | 7th* (FIG. 1G) | | 8th* (FIG. 1H) | | 1st* |
|---|---|---|---|---|---|---|---|---|---|---|---|
| | master-intake-stroke | | master-compression-stroke | | | | master-expansion-stroke | | master-exhaust-stroke | | |
| Slave Cylinder | 8th* | 2nd* (FIG. 1B) | | 4th* (FIG. 1D) | | 6th* | 7th* (FIG. 1G) | | 8th* (FIG. 1H) | | |
| | | slave-intake-stroke | | slave-compression-stroke | | | slave-expansion-stroke | | slave-exhaust-stroke | | |
| Crankshaft Reference Angle | 0 | 90 | 180 | 270 | 360 | 450 | 540 | 630 | 720 | 810 | |

8-process-sequence note:
1st = the master-intake-process (FIG. 1A)
2nd = the slave-intake-process (FIG. 1B)
3rd = the master-compression-process (FIG. 1C)
4th = the slave-compression-process (FIG. 1D)
5th = the hot-combustion-process (FIG. 1E)
6th = the injection-process (FIG. 1F)
7th = the cold-expansion-process (FIG. 1G)
8th = the slave-exhaust-process (FIG. 1H)

Operation Table.1H
8-stroke operation configured with 90 degree phase-difference in heavy load condition

| Master Cylinder | 1st* (FIG. 1A) | | 3rd* (FIG. 1C) | | 5th* (FIG. 1E) | 6th* | 7th* (FIG. 1G) | | 8th* (FIG. 1H) | | 1st* |
|---|---|---|---|---|---|---|---|---|---|---|---|
| | master-intake-stroke | | master-compression-stroke | | master-expansion-stroke | | | | master-exhaust-stroke | | |
| Slave Cylinder | 8th* | 2nd* (FIG. 1B) | | 4th* (FIG. 1D) | | | 6th* | 7th* (FIG. 1G) | 8th* (FIG. 1H) | | |
| | | slave-intake-stroke | | slave-compression-stroke | | | | slave-expansion-stroke | slave-exhaust-stroke | | |
| Crankshaft Reference Angle | 0  90  180  270  360  450  540  630  720  810 | | | | | | | | | | |

8-process-sequence note:

1st = the master-intake-process (FIG. 1A)

2nd = the slave-intake-process (FIG. 1B)

3rd = the master-compression-process (FIG. 1C)

4th = the slave-compression-process (FIG. 1D)

5th = the hot-combustion-process (FIG. 1E)

6th = the injection-process

7th = the cold-expansion-process (FIG. 1G)

8th = the slave-exhaust-process (FIG. 1H)

Operation Table.2L
8-stroke operation configured with 120 degree phase-difference in light load condition

| Master Cylinder | 1st* | | 3rd* | | 5th* | 6th* | 7th* | | 8th* | | 1st* |
|---|---|---|---|---|---|---|---|---|---|---|---|
| | master-intake-stroke | | master-compression-stroke | | master-expansion-stroke | | | | master-exhaust-stroke | | |
| Slave Cylinder | 8th* | 2nd* | | 4th* | | | 6th* | 7th* | 8th* | | |
| | | slave-intake-stroke | | slave-compression-stroke | | | | slave-expansion-stroke | slave-exhaust-stroke | | |
| Crankshaft Reference Angle | 0  90  180  270  360  450  540  630  720  810  900 | | | | | | | | | | |

8-process-sequence note:

1st = the master-intake-process

2nd = the slave-intake-process

3rd = the master-compression-process

4th = the slave-compression-process

5th = the hot-combustion-process

6th = the injection-process

7th = the cold-expansion-process

8th = the slave-exhaust-process

Operation Table.2M
8-stroke operation configured with 120 degree phase-difference in medium load condition

| Master Cylinder | 1st* | | 3rd* | | 5th* | | 6th* | 7th* | | 8th* | | | 1st* | |
|---|---|---|---|---|---|---|---|---|---|---|---|---|---|---|
| | master-intake-stroke | | master-compression-stroke | | master-expansion-stroke | | | | | master-exhaust-stroke | | | | |
| Slave Cylinder | 8th* | | 2nd* | | | 4th* | 6th* | | 7th* | | 8th* | | | |
| | | | slave-intake-stroke | | slave-compression-stroke | | | | slave-expansion-stroke | | | slave-exhaust-stroke | | |
| Crankshaft Reference Angle | 0 | 90 | 180 | 270 | 360 | 450 | | 540 | | 630 | 720 | | 810 | 900 |

8-process-sequence note:
1st = the master-intake-process
2nd = the slave-intake-process
3rd = the master-compression-process
4th = the slave-compression-process
5th = the hot-combustion-process
6th = the injection-process
7th = the cold-expansion-process
8th = the slave-exhaust-process Operation Table.2H
8-stroke operation configured with 120 degree phase-difference in heavy load condition

| Master Cylinder | 1st* | | 3rd* | | 5th* | | 6th* | 7th* | | 8th* | | | 1st* | |
|---|---|---|---|---|---|---|---|---|---|---|---|---|---|---|
| | master-intake-stroke | | master-compression-stroke | | master-expansion-stroke | | | | | master-exhaust-stroke | | | | |
| Slave Cylinder | 8th* | | 2nd* | | | 4th* | 6th* | | 7th* | | 8th* | | | |
| | | | slave-intake-stroke | | slave-compression-stroke | | | | slave-expansion-stroke | | | slave-exhaust-stroke | | |
| Crankshaft Reference Angle | 0 | 90 | 180 | 270 | 360 | 450 | | 540 | | 630 | 720 | | 810 | 900 |

8-process-sequence note:
1st = the master-intake-process
2nd = the slave-intake-process
3rd = the master-compression-process
4th = the slave-compression-process
5th = the hot-combustion-process
6th = the injection-process
7th = the cold-expansion-process
8th = the slave-exhaust-process

The invention claimed is:

1. A two-stage-coordination type eight-stroke engine comprising:
   a) a master cylinder (110) and a slave cylinder (120) for performing the eight-stroke-operation with the 8-process-sequence; said eight-stroke-operation includes the master-intake-stroke, the slave-intake-stroke, the master-compression-stroke, the slave-compression-stroke, the master-expansion-stroke, the slave-expansion-stroke, the master-exhaust-stroke, and the slave-exhaust stroke; said 8-process-sequence includes the master-intake-process, the slave-intake-process, the master-compression-process, the slave-compression-process, the hot-combustion-process, the injection-process, the cold-expansion-process, the slave-exhaust-process;
   b) said master cylinder (110) includes a master piston (111) and said slave cylinder (120) includes a slave piston (121), wherein said master piston (111) and said slave piston (121) must constructed with a phase-difference between 60 degree and 150 degree to perform the eight-stroke-operation;
   c) said master cylinder includes fuel-supplying means and ignition means (150) for initiating the hot-combustion-process;

d) said master cylinder (110) includes a master-intake-valve (113) for admitting air into the master cylinder (110) during the master-intake-process;
e) said slave cylinder (120) includes a slave-intake-valve (123) for admitting air into the slave cylinder (120) during the slave-intake-process;
f) said slave cylinder (120) includes a slave-exhaust-valve (128) for expelling a flow of cold-expansion-medium out of the slave cylinder (120) during the slave-exhaust-process;
g) a coordinate-port (160) and a coordinate-valve (161) and a coordinate-spring-adjuster (162) and a camshaft system (169) for performing the two-stage-coordination; said coordinate-valve (161) is opened two times in each round of the eight-stroke-operation, wherein the coordinate-valve (161) is opened for the first time with the force exerted by the high-density-air for at least 5 degree of crankshaft rotation before the completion of the slave-compression-stroke, next the coordinate-valve (161) is opened for the second time with the camshaft system (169) after the slave piston (120) has started the slave-expansion-stroke.

2. A two-stage-coordination type eight-stroke engine as defined in claim 1, wherein, the injection-process can start at any point between the first 30 degree of the master-expansion-stroke and the last 30 degree of the slave-compression-stroke.

3. A two-stage-coordination type eight-stroke engine as defined in claim 2, wherein, the open-time of the coordinate-valve is at least 5 degree of crankshaft rotation before the completion of the slave-compression-stroke.

4. A two-stage-coordination type eight-stroke engine as defined in claim 3 further comprises a turbo-charger system, wherein; a compressor (105) of said turbo-charger system will supply a flow of pressurized air into the slave cylinder to raise the intake pressure of the slave-intake-process, a turbine (106) of said turbo-charger system will receive a flow of cold-expansion-medium from the slave cylinder during the slave-exhaust-process.

5. A two-stage-coordination type eight-stroke engine as defined in claim 4, wherein; the actuation of the coordinate-valve by said camshaft system (169) can be delayed up to 45 degree after the slave-expansion-stroke has started, thereby improving the fuel efficiency in the heavy load operation.

6. A two-stage-coordination type eight-stroke engine as defined in claim 5, wherein said coordinate-valve (161) is preferably to be constructed with air-guiding-grooves to inject the high-density-air in multi-directions during the injection-process.

7. A two-stage-coordination type eight-stroke engine as defined in claim 5, wherein; the master cylinder further comprises an auxiliary exhaust valve to expel the cold-expansion-medium out of the master cylinder (110) during the master-exhaust-stroke.

8. A two-stage-coordination type eight-stroke engine as defined in claim 5, wherein said camshaft system used for opening the coordinate-valve during the cold-expansion-process and the slave-exhaust process can be substituted with a hydraulic actuator or an electric servo-actuator.

9. A two-stage-coordination type eight-stroke engine comprising:
a) an eight-stroke engine operating with the 8-process-sequence, and said eight-stroke engine includes a master cylinder (110), a slave cylinder (120), a master piston (111), a slave piston (121), a master-intake-valve (113), a slave-intake-valve (123), a slave-exhaust-valve (128), a coordinate-port (160), a coordinate-valve (161), a camshaft system (169) for performing the two-stage-coordination; wherein said master cylinder (110) includes ignition means (150) and fuel-supplying means;
b) the 8-process-sequence includes the master-intake-process, the slave-intake-process, the master-compression-process, the slave-compression-process, the hot-combustion-process, the injection-process, the cold-expansion-process, the slave-exhaust-process; wherein the master piston (111) and the slave piston (121) is constructed with a phase-difference between 60 degree and 150 degree to perform the 8-process-sequence;
c) said coordinate-valve will open twice in each round of the 8-process-sequence, wherein said coordinate-valve (161) is opened for the first time at the threshold pressure at the end of the slave-compression-process to inject the high-density-air of the coordinate-port (160) into the master cylinder (110), and said coordinate-valve (161) is opened for the second time with said camshaft system (169) after the TDC position of the slave piston (121) during the cold-expansion-process;
d) said coordinate-valve (161) will open for at least 5 degree of crankshaft rotation to inject the high-density-air during the injection-process, and said coordinate-valve (161) will be shut immediately after the air-pressure of said coordinate-port (160) has dropped to lower than the pressure of said master cylinder (110);
e) said coordinate-valve (161) will be opened with the camshaft system (169) for at least 120 degree of crankshaft rotation after the slave piston (121) has started the slave-expansion-stroke, and said coordinate-valve (161) will be shut before the TDC position of the master-exhaust-stroke;
f) said master-intake-process is the process to inhale air into the master cylinder (110) with said master-intake-valve (113);
g) said slave-intake-process is the process to inhale air into the slave cylinder (120) with said slave-intake-valve (123);
h) said master-compression-process is the process to compress the air in the master cylinder (110);
i) said slave-compression-process is the process to compress the air of the slave cylinder (120) into said coordinate-port (160) as a high-density-air;
j) said hot-combustion-process is the process to ignite an air-fuel mixture as a hot-combustion-medium in the master cylinder (110);
k) said injection-process is the process to inject said high-density-air into said master cylinder (110) to form a cold-expansion-medium, wherein the coordinate-valve (161) is actuated with the pressure difference between the coordinate-port (160) and the master cylinder (110);
l) said cold-expansion-process is the process that generates power with the master piston (111) and the slave piston (121), wherein the cold-expansion-medium will flow from the master cylinder (110) to the slave cylinder (120) through the coordinate-port (160), the coordinate-valve (161) is actuated with the camshaft system (169);
m) said slave-exhaust-process is the process to expel the cold-expansion-medium out of the slave cylinder (120) with the slave-exhaust-valve (123).

10. A two-stage-coordination type eight-stroke engine as defined in claim 9 further comprises a turbo-charger system, wherein a turbine (106) of said turbo-charger system receives a flow of cold-expansion-medium from the slave cylinder (120) during the slave-exhaust-process, a compressor (105)

of said turbo-charger system will charge a flow of pressurized air into the slave cylinder (120) to increase the intake pressure of the slave-intake-process.

11. A two-stage-coordination type eight-stroke engine as defined in claim 10, wherein; the master cylinder (110) further comprises an auxiliary-exhaust-valve to expel the cold-expansion-medium directly to the turbine (105) of said turbo-charger system during the master-exhaust-stroke to reduce the overall pumping loss.

12. A two-stage-coordination type eight-stroke engine as defined in claim 10, wherein the master piston (111) and the slave piston (121) can be connected with two separate crankshafts, and said two crankshafts are synchronized with gears.

13. A two-stage-coordination type eight-stroke engine as defined in claim 9, wherein; the fuel type can be gasoline, diesel, natural gas, or methanol; said fuel-supplying means can be a direct-injection nozzle, a fuel pump, a carburetor, or a propane converter depending on the fuel type.

14. A two-stage-coordination type eight-stroke engine as defined in claim 9, wherein; the actuation of the coordinate-valve by said camshaft system (169) can be delayed up to 45 degree after the slave-expansion-stroke has started, thereby improving the fuel efficiency in the heavy load operation.

15. A two-stage-coordination type eight-stroke engine as defined in claim 14, wherein said camshaft system used for opening the coordinate-valve (161) during the cold-expansion-process and the slave-exhaust process can be substituted with a hydraulic actuator or an electric servo-actuator.

16. A two-stage-coordination type eight-stroke engine as defined in claim 9 further comprises a coordinate-spring-adjuster (162) to adjust the spring tension on the coordinate-valve (161) to control the open-time of the coordinate-valve (161).

17. A two-stage-coordination type eight-stroke engine as defined in claim 10, wherein, said coordinate-valve (161) is constructed with air-guiding-grooves to inject the high-density-air in multi-directions during the injection-process.

18. A two-stage-coordination type eight-stroke engine comprises:
 a) a master cylinder (110) and a slave cylinder (120) for performing the eight-stroke-operation and the 8-process-sequence; the 8-process-sequence includes the master-intake-process, the slave-intake-process, the master-compression-process, the slave-compression-process, the hot-combustion-process, the injection-process, the cold-expansion-process, the slave-exhaust-process;
 b) said master cylinder (110) includes a reciprocating master piston (111), which will perform the master-intake-stroke, the master-compression-stroke, the master-expansion-stroke, and the master-exhaust-stroke;
 c) said slave cylinder (120) includes a reciprocating slave piston (121), which will perform the slave-intake-stroke, the slave-compression-stroke, the slave-expansion-stroke, and the slave-exhaust-stroke;
 d) a coordinate-port (160) and a coordinate-valve (161) and a camshaft system (169) for performing the two-stage-coordination;
 e) said coordinate-valve (161) will open twice in each round of the 8-process-sequence, wherein said coordinate-valve (161) is opened for the first time at the threshold pressure at the end of the slave-compression-process to inject a flow of high-density-air into the master cylinder (110), and said coordinate-valve (161) is opened for the second time with said camshaft system (169) after the slave piston (121) has started the slave-expansion-stroke;
 f) said coordinate-valve (161) will open for at least 5 degree crankshaft rotation during the injection-process before the completion of the slave-compression-stroke; said coordinate-valve (161) will open for at least 120 degree of crankshaft rotation during the cold-expansion-process after the slave piston has started the slave-expansion-stroke.

19. A two-stage-coordination type eight-stroke engine as defined in claim 18, wherein, the master piston (110) and the slave piston (120) must have a phase-difference between 60 degree and 150 degree to perform the eight-stroke-operation.

20. A two-stage-coordination type eight-stroke engine as defined in claim 19, wherein, the master piston (110) and the slave piston (120) can be coupled with one crankshaft or two separate crankshafts with gears.

* * * * *